H. H. WAIT.
ELECTRIC GENERATING SYSTEM.
APPLICATION FILED OCT. 7, 1909.
1,078,179.
Patented Nov. 11, 1913.
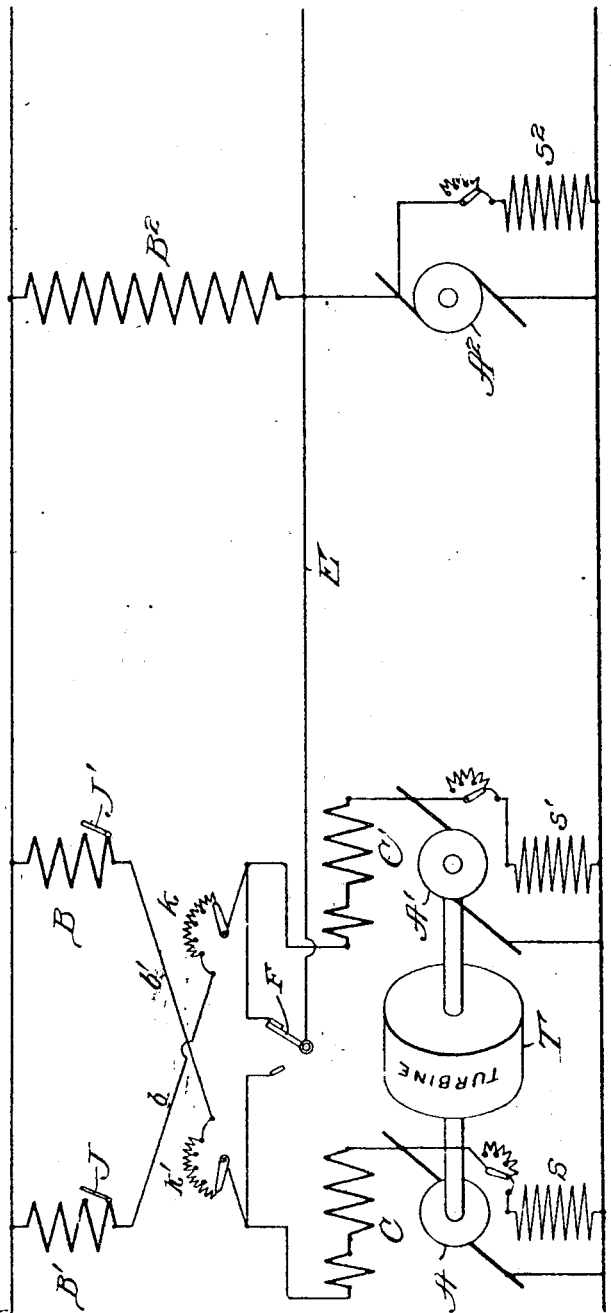

though to overcome this tendency, yet the compensating windings should not be coupled directly together as in the ordinary case, because

UNITED STATES PATENT OFFICE.

HENRY H. WAIT, OF CHICAGO, ILLINOIS.

ELECTRIC GENERATING SYSTEM.

1,078,179.

Specification of Letters Patent. Patented Nov. 11, 1913.

Application filed October 7, 1909. Serial No. 521,448.

*To all whom it may concern:*

Be it known that I, HENRY H. WAIT, citizen of the United States, residing at Chicago, in the county of Cook and State of Illinois, have invented a certain new and useful Improvement in Electric Generating Systems, of which the following is a full, clear, concise, and exact description.

My invention relates to an electric generating system and particularly to high speed direct current generating sets in which two dynamos are mechanically connected together and operated from a single prime mover such as a steam turbine.

It is frequently found desirable to connect two or more dynamos to the same turbine or other prime mover for the reason that two smaller generators can be run at a higher number of revolutions than if the generator consisted of a single large unit. In high speed dynamos of this character, it is usually necessary, on account of the high speed of commutation, to provide some special means of accomplishing the sparkless commutation of the current. As it is well known, compensating windings are employed for such purposes. these windings producing a magnetizing effect at an angle of approximately 90°, electrically considered, from that of the main magnetizing windings. Dynamos of this character are always more or less sensitive to changes in load or conditions, because the high speed of the machines naturally results in a character of design in which the armature and the series windings on the field have a small number of turns of large cross section as compared with a slow speed machine of the same rating. The high speed of the machine makes it necessary also to use low magnetic densities in the armature to avoid excessive heating. There is consequently neither the ordinary internal resistance of the machine nor the magnetic saturation of the armature to provide the requisite inherent tendency to stability of load. On the other hand, the peripheral speed of the commutators of such machines is generally very high and the resistance of the brush contact is a very large proportion of the total resistance to the current in passing through the machine. This contact resistance, on account of the high speed and consequently low permissible brush tension, is very sensitive to such differences in resistance as are produced by lubrication or dirt on the commutator, so that there is a tendency to produce violent shifting of the load from one machine to another which is operating in parallel with it by very small disturbing causes.

It is not possible to connect an equalizing wire or bus directly between the terminals of the armatures as is the usual practice in ordinary dynamos, because this would distribute the current in the compensating windings in proportion to the external resistances in their circuits, whereas the current in the compensating windings should be proportional in each to its own armature current.

If the main series windings were connected on each machine in the usual way with an equalizing connection, there would be difficulty from the violent shifting of load from one machine to the other. This is because the machines are both rigidly connected to the same prime mover, so that the machine taking the greater load cannot slow down and give up part of its load to the other, as would be the case if they were connected to separate engines as in ordinary practice. In such machines, although the compensating windings act approximately at right angles to the main magnetizing effect, and are therefore mainly neutral in effect on the voltage, their strength and direction of force are sometimes such as to add a magnetizing component, which will tend to increase the voltage on load. In any event, they approximately neutralize the cross magnetizing effect of the armature which, in ordinary machines, tends to distort the field flux and thereby to introduce stability with increasing load. It will therefore be seen that such machines would have a tendency to be unstable when connected together by an equalizer, either at the armature terminals or between the main series windings. This difficulty of instability, it has been the object of my invention to overcome.

My invention contemplates an arrangement for producing stability in the system and dividing the load approximately between the different generators of a set driven by a common prime mover.

The invention consists in providing in addition to the shunt field winding and compensating series winding a compound series winding so connected in the system that as the load increases on one machine the field strength of the other machine is increased and vice versa. The preferred specific embodiment of my invention consists in connecting the compound series field of each of two machines in series with the armature and compensating series windings of the other machine.

The several features of my invention may be more readily understood by reference to the accompanying drawing showing diagrammatically a generating set embodying my invention.

T indicates a steam turbine or other high speed prime mover and A, and $A^1$ indicate the armatures of two direct current generators, such armatures being mechanically connected together and driven either directly or in other suitable manner from the prime mover T.

S, $S^1$ and C, $C^1$ are the usual shunt field and the series compensating windings, respectively.

B and $B^1$ are the compounding series windings of the generators A and $A^1$, respectively. It will be particularly noted that by means of cross connections $b$ and $b^1$, respectively, the compounding series windings of one machine are connected in series with the compensating winding and the armature of the other machine. By such an arrangement if there should be such an increase in resistance at the brushes or elsewhere on one machine as would tend to decrease the load on that machine, the current in the series compounding winding on the other machine will likewise be decreased, thereby decreasing the compounding effect on the other machine, so that there is a tendency to divide the load equally between the two machines in spite of such causes as may tend to produce a fluctuation in the load of either machine.

An ordinary compound dynamo $A^2$ having the shunt and series windings $s^2$ and $B^2$, respectively, may be employed in parallel with the turbine set A and $A^1$ for supplying current to the mains. Since the series coils $B^2$ of such machine $A^2$ are ordinarily of higher resistance than the series coils of the turbo-generators A and $A^1$, there is a tendency, when the equalizer connection E is closed, for too much current to go through the turbo-generator or generators connected to the generator $A^2$ by said equalizer connection. Rheostats K and $K^1$ are hence provided by means of which the current flowing through the coils B and $B^1$ can be adjusted. The switch F connected to the equalizer E permits of connecting the generator $A^2$ with either of the generators A or $A^1$ or of disconnecting it from both of said generators A and $A^1$. Switches J and $J^1$ are also preferably provided for short-circuiting portions of the series windings B and $B^1$ and thereby adjusting the compounding effect of the dynamo so as to get the best operation whether or not the turbo-set A, $A^1$ is running in parallel with the generator $A^2$.

Having thus described the preferred embodiment of my invention, what I claim is:

1. In an electric generating system, the combination with a prime mover, of two generators mechanically connected together and electrically connected to the same load, each of said generators being provided with a compensating series winding and a compounding series winding, said latter winding of each machine being electrically connected in series with the other machine.

2. In an electric generating system, the combination with a plurality of generators connected in parallel, each generator being provided with series compensating windings and series compounding windings, said compensating windings of each machine being connected in series with its own armature, and said compounding windings of each machine being connected in series with the armature of another of said generators.

In witness whereof, I hereunto subscribe my name this fifth day of October, A. D. 1909.

HENRY H. WAIT.

Witnesses:
GEORGE E. FOLK,
MCCLELLAND YOUNG.